United States Patent [19]
Sanpei et al.

[11] Patent Number: 6,061,214
[45] Date of Patent: May 9, 2000

[54] TAPE CASSETTES

[75] Inventors: Takaaki Sanpei; Kazuo Sasaki; Hitomi Chiba, all of Miyagi, Japan

[73] Assignee: Sony Corporation, Tokyo, Japan

[21] Appl. No.: 09/081,009

[22] Filed: May 19, 1998

[30] Foreign Application Priority Data

May 21, 1997 [JP] Japan .................................. 9-130220

[51] Int. Cl.$^7$ .................................................. G11B 23/02
[52] U.S. Cl. .................... 360/132; 360/132; 360/74.6; 369/291
[58] Field of Search .............................. 360/132, 74.6; 369/291

[56] References Cited

U.S. PATENT DOCUMENTS

| | | | |
|---|---|---|---|
| 4,143,848 | 3/1979 | Slemmons | 248/489 |
| 5,121,275 | 6/1992 | Komiyama | 360/132 |
| 5,579,191 | 11/1996 | Alexander et al. | 360/132 |
| 5,612,844 | 3/1997 | Alexander et al. | 360/132 |

FOREIGN PATENT DOCUMENTS

| | | |
|---|---|---|
| 0 609 546 A2 | 8/1994 | European Pat. Off. . |
| 96 34388 | 10/1996 | WIPO . |

*Primary Examiner*—William Klimowicz
*Attorney, Agent, or Firm*—Ronald P. Kananen; Rader, Fishman & Grauer

[57] ABSTRACT

A tape cassette includes a shell, first and second bosses arranged on the inner surface of the shell, and a prism mounted on the inner surface of the shell and formed with first and second holes and having an optical axis which corresponds to an optical axis of light emitted from a tape-position sensor of a drive. The first and second bosses are arranged through the first and second holes. When the first and second bosses contact the inner peripheral surfaces of the first and second holes, a first clearance between the first boss and the first hole and a second clearance between the second boss and the second hole is produced in the opposite direction of the first and second bosses with respect to the optical axis of the prism.

5 Claims, 15 Drawing Sheets

TAPE CASSETTES

BACKGROUND OF THE INVENTION

The present invention relates generally to tape cassettes, and more particularly, to the tape cassettes provided with a prism for detecting a tape end.

Referring to FIG. 14, a known tape cassette 101 of this type has a prism 103 as optical-path changing means mounted on the inner surface of a cassette or shell 102. When inserting the tape cassette 101 into a drive such as a tape recorder, an incidence plane 103a of the prism 103 faces a light emitting element 202 of a tape-position sensor 201 mounted to the drive, whereas a projection plane 103b of the prism 103 faces a light receiving element 203 of the tape-position sensor 201. Detection light 204 emitted from the light emitting element 202 enters the prism 103 through the incidence plane 103a, which is perpendicularly reflected by first and second reflecting surfaces 103c, 103d, then projected from the projection plane 103b to a magnetic tape 104 and a transparent leader tape, not shown, connected to an end thereof. A difference in quantity of detection light after passing through the magnetic tape 104 or the leader tape is detected by the light receiving element 203 to determine the tape end, etc.

Referring to FIG. 15, the cassette or shell 102, which is formed out of a thermoplastic synthetic resin, includes first and second bosses 111, 112 integrated with an inner surface of an upper half.

The bosses 111, 112 are arranged symmetrical with respect to a prism mounting reference line $Cl_1$ which corresponds to an optical axis of detection light 204 emitted from the light emitting element 202.

The prism 103 is formed out of a transparent thermoplastic synthetic resin. The prism 103 includes horizontal and vertical portions 103e, 103f, having a substantially L-shape. Arranged on both sides of the horizontal portion 103e are first and second mounting base plates 121, 122 which are formed with first and second boss insertion holes 131, 132.

The boss insertion holes 131, 132 are arranged symmetrical with respect to an optical axis $Cl_2$ of the horizontal portion 103e, each hole being shaped like a larger ellipse to enable engagement of the corresponding boss 111, 112 with predetermined clearances. Such shaping of the boss insertion holes 131, 132 allows easy and sure insertion of the bosses 111, 112.

The bosses 111, 112 are arranged through the boss insertion holes 131, 132, and ends of the bosses 111, 112 are put to a horn of an ultrasonic welding machine for softening and melting, obtaining heads 111a, 112a with larger diameter than that of the boss insertion holes 131, 132 as shown in FIG. 14. Thus, the prism 103 is mounted on the inner surface of the cassette 102.

With the known tape cassette 101, as described above, the bosses 111, 112 are arranged symmetrical with respect to the prism mounting reference line $Cl_1$ which corresponds to the optical axis of detection light 204 emitted from the light emitting element 202, and the boss insertion holes 131, 132 are arranged symmetrical with respect to the optical axis $Cl_2$ of the horizontal portion 103e of the prism 103. Moreover, predetermined clearances are defined between the bosses 111, 112 and the boss insertion holes 131, 132. As a consequence, referring to FIG. 16A, when making the optical axis $Cl_2$ of the horizontal portion 103e correspond to the prism mounting reference line $Cl_1$ or the optical axis of detection light 204 emitted from the light emitting element 202, and putting the bosses 111, 112 in contact with the inner peripheral surfaces of the boss insertion holes 131, 132, a first clearance $\delta_1$ between the first boss 111 and the first boss insertion hole 131, and a second clearance $\delta_2$ between the second boss 112 and the second boss insertion hole 132 are produced in the same direction of the bosses 111, 112 with respect to the optical axis or therebelow as viewed in FIG. 16A, having the following inconveniences:

First, it is difficult to make the optical axis $Cl_2$ of the horizontal portion 103e of the prism 103 correspond to the prism mounting reference line $Cl_1$. The reason is that, in the state as shown in FIG. 16A, if clockwise force $F_1$ acts on the prism 103, the prism 103 is inclined clockwise as shown in FIG. 16B. On the other hand, if counterclockwise force $F_2$ acts on the prism 103, the prism 103 is inclined counterclockwise as shown in FIG. 16C. This results in displacement of an optical axis of the prism 103.

FIG. 17 shows the relationship between the amount of displacement between the optical axis of detection light 204 emitted from the light emitting element 202 and that of the prism 103 and the return quantity of detection light 204. As seen in FIG. 17, if the amount of displacement between the optical axis of detection light 204 and that of the prism 103 is zero, the return quantity of detection light 204 is approximately 80% of the projection quantity thereof. However, if the amount of displacement is 0.2 mm, the return quantity is approximately 60%. If the amount of displacement is 0.3 mm or more, the return quantity is 50% or less, resulting in unstable and unreliable light detection.

Second, referring to FIG. 18, a width W of a detection-light window 141 of the cassette 102 can be reduced to decrease the amount of displacement. With this structure, if the prism 103 is inclined, an end of the horizontal portion 103e of the prism 103 contacts the inner side face of the detection-light window 141 of the cassette 102, restraining the amount of displacement. However, if ultrasonic wave is applied to the bosses 111, 112 in that state, the end of the horizontal portion 103e contacting the inner side face of the detection-light window 141 can be melted and deformed to have a bad influence on the performance of the prism 103.

It is, therefore, an object of the present invention to provide tape cassettes which enable stable and reliable light detection and easy assembling with simple structure.

SUMMARY OF THE INVENTION

One aspect of the present invention lies in providing a tape cassette for use in a drive with a tape-position sensor emitting a light, comprising:

a shell with an inner surface;

first and second bosses arranged on said inner surface of said shell; and a prism mounted on said inner surface of said shell, said prism being formed with first and second holes and having an optical axis, said optical axis corresponding to an optical axis of the light emitted from the tape-position sensor, said first and second bosses being arranged through said first and second holes, when said first and second bosses contacting inner peripheral surfaces of said first and second holes, a first clearance between said first boss and said first hole and a second clearance between said second boss and said second hole being produced in an opposite direction of said first and second bosses with respect to said optical axis of said prism.

Another aspect of the present invention lies in providing an arrangement, comprising:

a drive with a tape-position sensor emitting a light; and a tape cassette arranged in said drive when used, said tape cassette comprising:

a shell with an inner surface;

first and second bosses arranged on said inner surface of said shell;

a prism mounted on said inner surface of said shell, said prism being formed with first and second holes and having an optical axis, said optical axis corresponding to an optical axis of said light emitted from said tape-position sensor, said first and second bosses being arranged through said first and second holes, when said first and second bosses contacting inner peripheral surfaces of said first and second holes, a first clearance between said first boss and said first hole and a second clearance between said second boss and said second hole being produced in an opposite direction of said first and second bosses with respect to said optical axis of said prism.

DETAILED DESCRIPTION OF THE INVENTION

Figure 1:
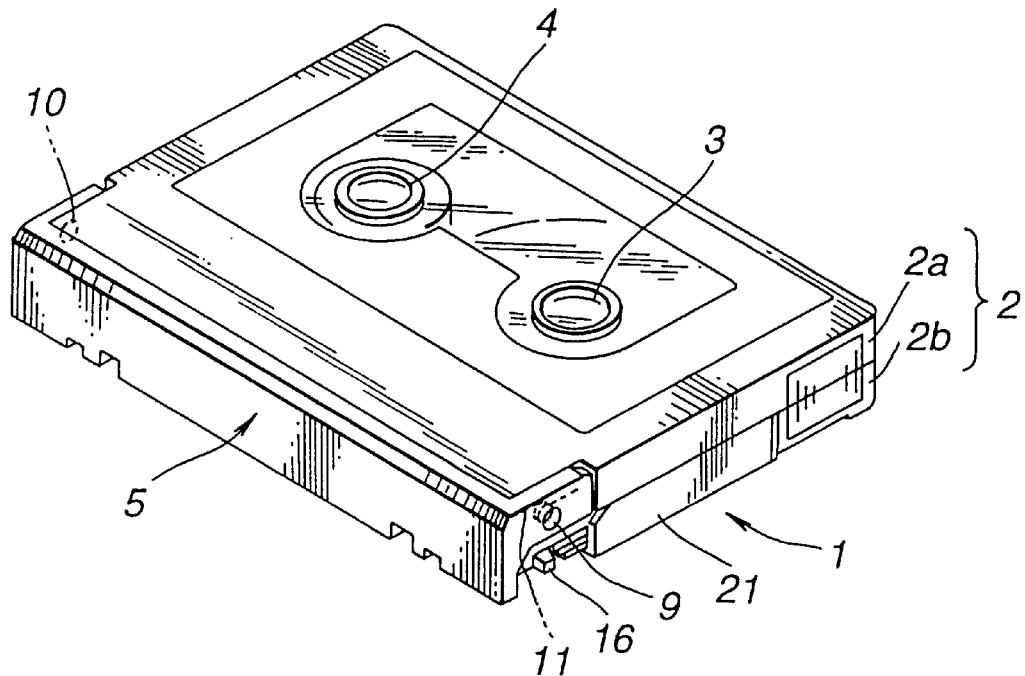
FIG. 1 is a perspective view showing a first embodiment of a tape cassette according to the present invention.
Figure 2:
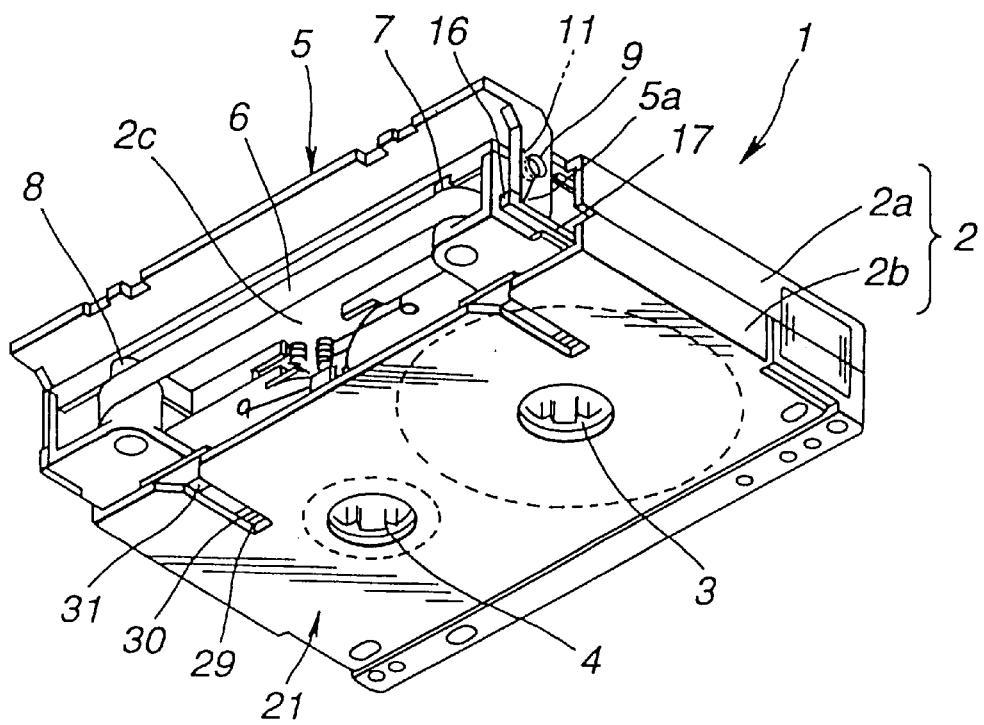
FIG. 2 is a view similar to FIG. 1, showing the tape cassette with a lid open.

FIGS. 1–9 show a first embodiment of a tape cassette according to the present invention. Referring to FIGS. 1–2, a tape cassette 1 comprises a cassette or shell 2, a pair of hubs or reels 3, 4 rotatably accommodated in the cassette 2, and a lid 5 for closing an opening 2c of the cassette 2 at the bottom of the front end.

The cassette 1 includes upper and lower halves 2a, 2b of a thermoplastic synthetic resin, which are connected to each other to form a flat rectangular solid.

The hubs 3, 4 are rotatably accommodated in the cassette 2. Connected to the hubs 3, 4 are both ends of a magnetic tape 6 wound thereto.

The magnetic tape 6 is put between a pair of tape guides 7, 8 arranged with the lower half 2b on both sides of the front face, running in the opening 2c.

The lid 5 is rotatably mounted to the cassette 2 through a pair of shafts 9, 10 to close the opening 2c. The lid 5 receives torque from a torsion coil spring 11 in the direction to close the opening 2c.

Figure 3:
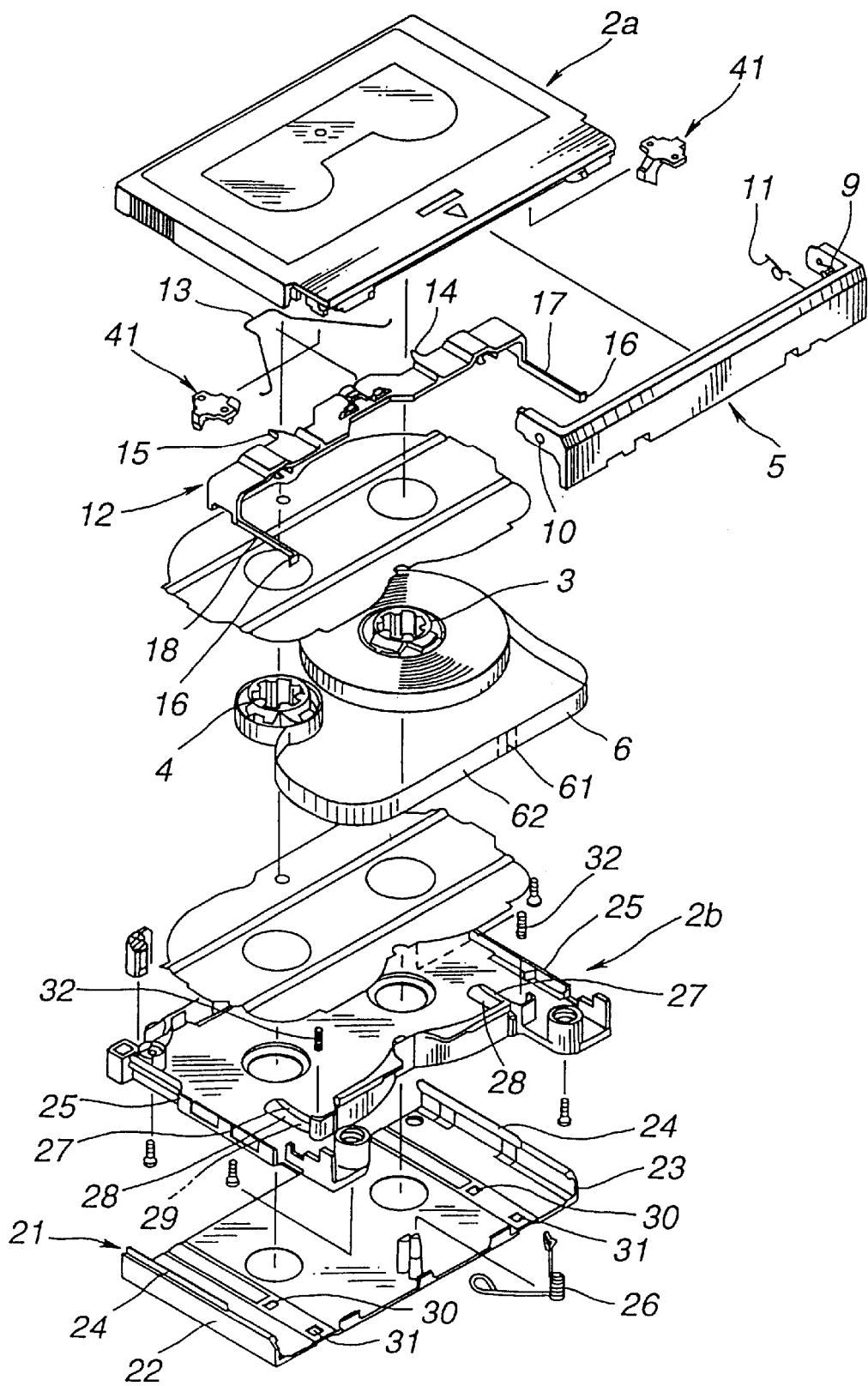
FIG. 3 is an exploded perspective view showing the tape cassette.

Referring to FIG. 3, a hub lock 12 is disposed below the upper half 2a. The hub lock 12 is biased backward by a hub-lock spring 13 so that a pair of hub-lock lugs 14, 15 arranged at the rear end is engaged with the pair of hubs 3, 4 to prevent rotation thereof.

A pair of arms 17, 18 each having a lid engagement 16 at an end is arranged on both sides of the hub lock 12. When opening the lid 5 as shown in FIG. 2, an end 5a of the lid 5 is engaged with the lid engagements 16 of the arms 17, 18, so that the hub lock 12 is moved against spring force of the hub-lock spring 13 to release engagement of the lock lugs 14, 15 with the hubs 3, 4, thus removing lock of the hubs 3, 4.

A slide plate 21 is slidably mounted to the lower half 2b on the lower side as shown in FIG. 2. The slide plate 21 includes side plates 22, 23 arranged adjacent to side plates of the lower half 2b, and engagements 24 arranged with the side plates 22, 23 to be engaged with grooves 25 of the side plates of the lower half 2b for closing the opening 2c. The slide plate 21 receives slide force from a torsion coil spring 26 in the direction to close the opening 2c.

A slide-plate lock lever 28 in the form of a substantially C-shaped slit is arranged on each side of the lower half 2b. A lock protrusion 29 is arranged with the lock lever 28 at an end of the lower side. The lock protrusion 29 is engaged with a first engagement hole 30 formed in the slide plate 21 to lock the slide plate 21 so as to close the opening 2c, or it is engaged with a second engagement hole 31 formed in the slide plate 21 to lock the slide plate 21 so as to open the opening 2c. The lock levers 28 receive torque from coil springs 32 in the direction that the lock protrusions 29 engage with the engagement holes 30, 31.

Figure 4A:
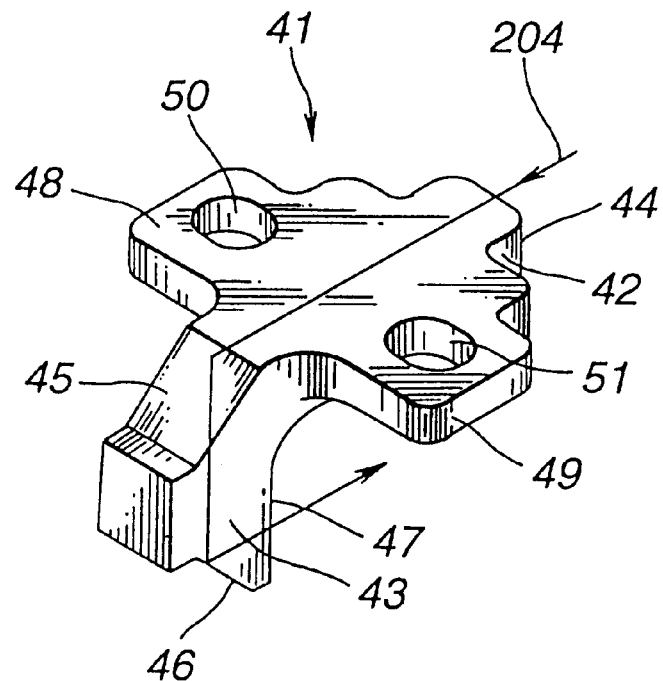
FIGS. 4A–4B are views similar to FIG. 2, showing a prism.
Figure 4B:
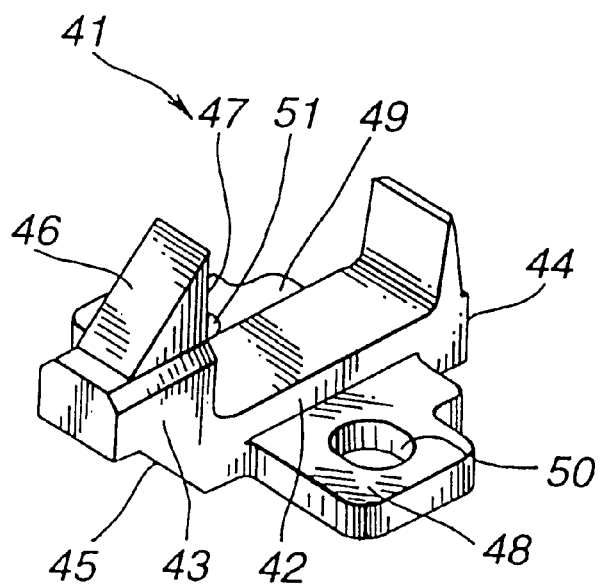
Figure 5:
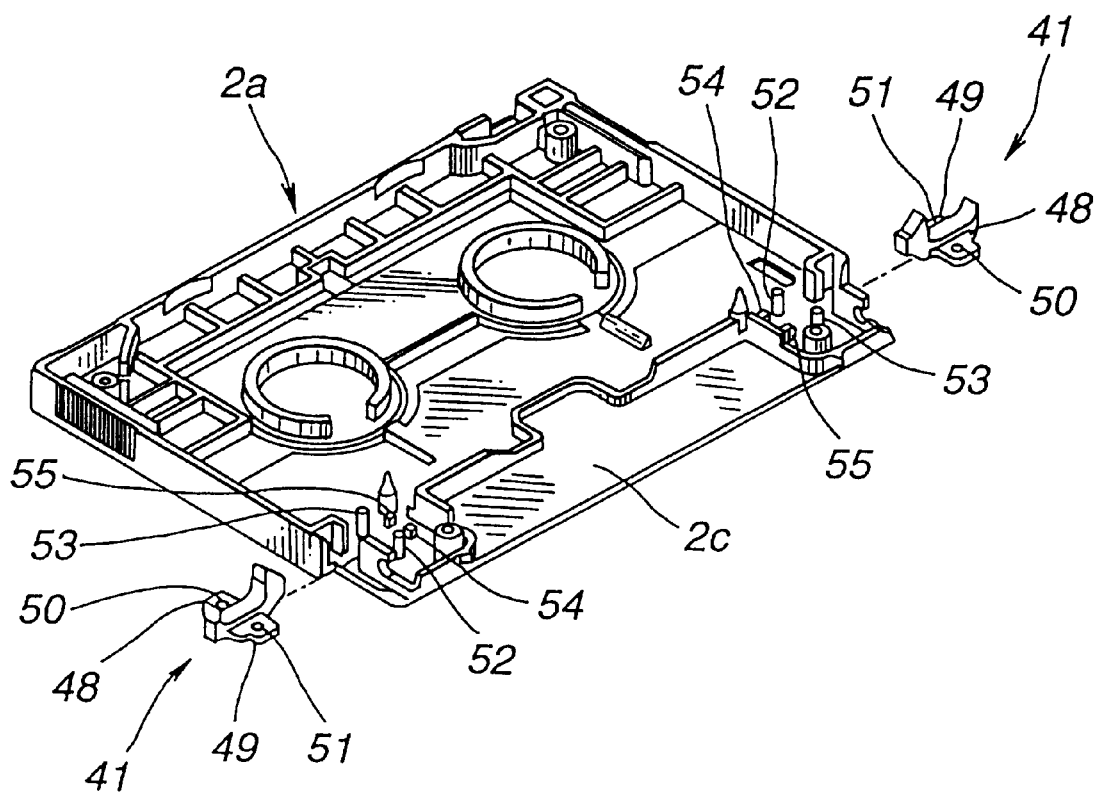
FIG. 5 is a view similar to FIG. 4B, showing an upper half of the tape cassette.

A tape-position detection prism 41 of a transparent synthetic resin is mounted to the upper half 2a on both sides of the front end. Referring to FIGS. 4A–5, the prism 41 includes horizontal and vertical portions 42, 43, having substantially an L-shape. The prism 41 is constructed such that detection light received from an incidence plane 44 of an end of the horizontal portion 42 is perpendicularly reflected by first and second reflecting surfaces 45, 46 of another end of the horizontal portion 42, then projected from an projection plane 47 of the vertical portion 43.

Integrated with the horizontal portion 42 of the prism 41 on both sides are first and second mounting or assembling base plates 48, 49 which are formed with first and second boss insertion holes 50, 51, respectively. The bosses 52, 53 arranged on the inner surface of the upper half 2a are inserted into the boss insertion holes 50, 51 of the base plates 48, 49, and both sides of the horizontal portion 42 of the prism 41 are held by a pair of positioning bosses 54, 55 arranged on the inner surface of the upper half 2a. In that state, ends of the bosses 52, 53 are applied to ultrasonic wave for melting, obtaining heads with larger diameter than that of the boss insertion holes 50, 51. Thus, the prism 41 is mounted on the inner surface of the upper half 2a.

Figure 6:
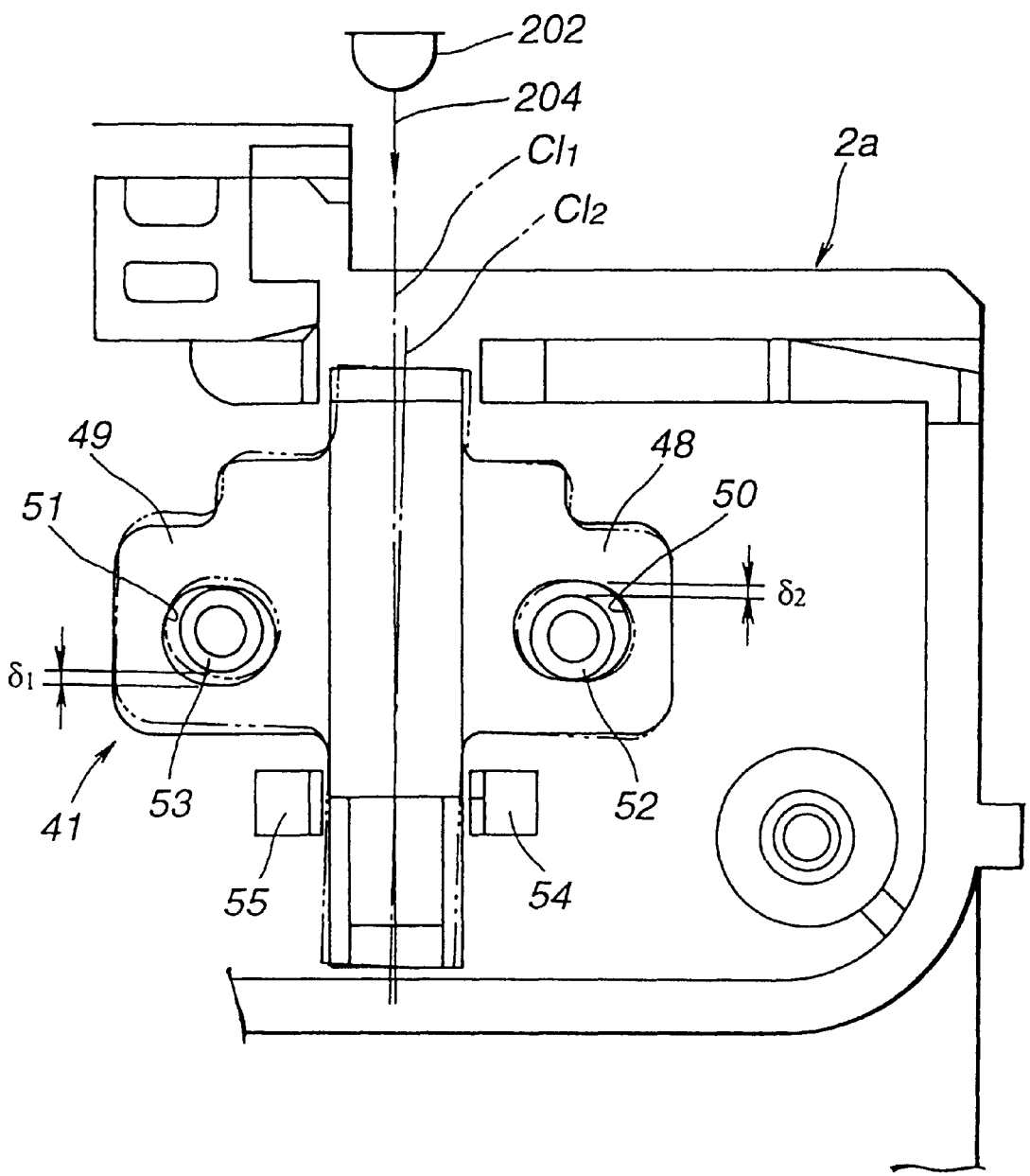
FIG. 6 is a plan view showing the upper half with the prism mounted.
Figure 7:
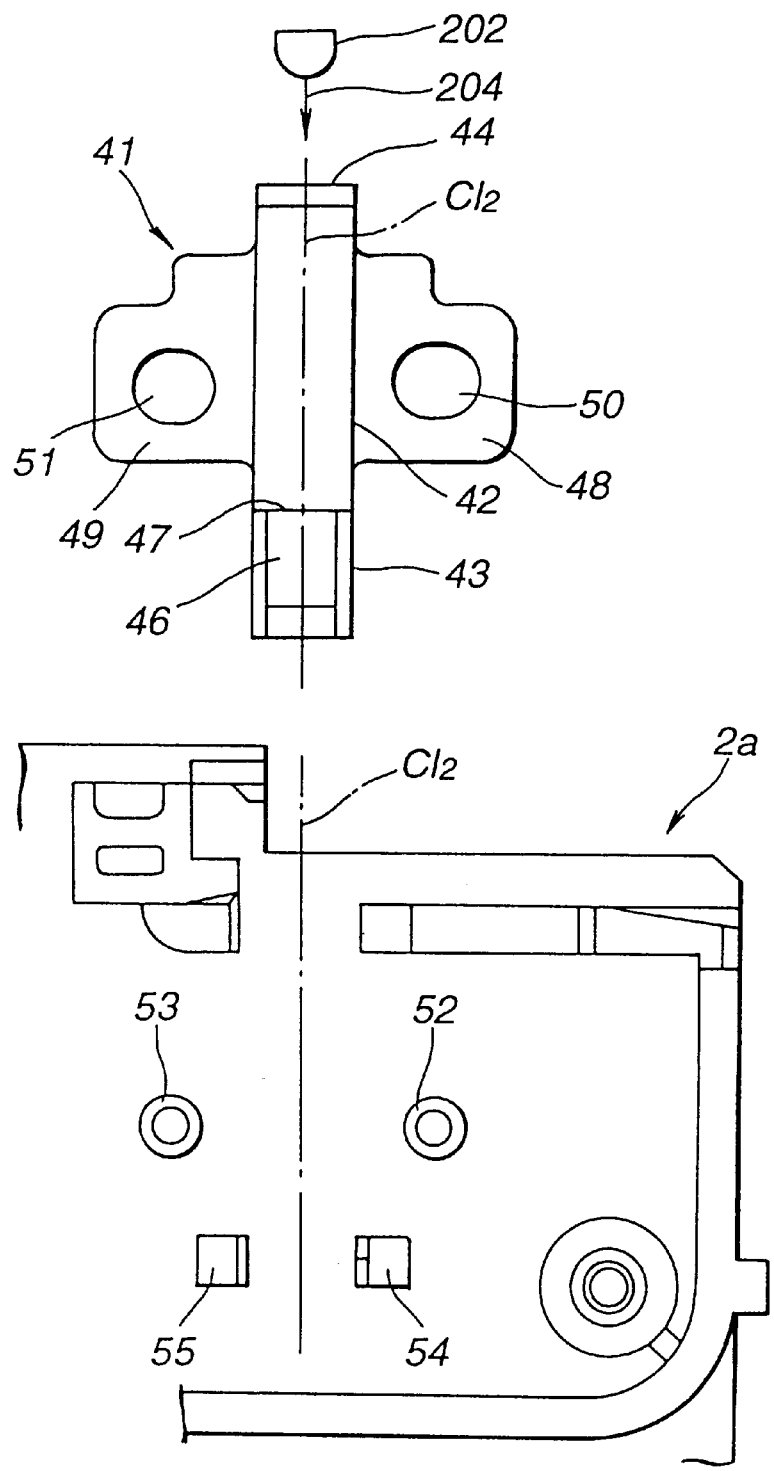
FIG. 7 is a view similar to FIG. 6, showing the upper half before mounting the prism.

Referring to FIG. 6, when making an optical axis $Cl_2$ of the horizontal portion 42 of the prism 41 correspond to a prism mounting reference line $Cl_1$ which corresponds to an optical axis of detection light 204 emitted from a light emitting element 202 of a tape-position sensor 201, and putting the bosses 52, 53 in contact with the boss insertion holes 50, 51, a first clearance $\delta_1$ between the first boss 52 and the first boss insertion hole 50, and a second clearance $\delta_2$ between the second boss 53 and the second boss insertion hole 51 are produced in the opposite direction of the bosses 52, 53 with respect to the optical axis.

In order to produce the clearances $\delta_1$, $\delta_2$ in the opposite direction of the bosses 52, 53, one of the boss insertion holes 50, 51 is displaced or decentered in the direction of the optical axis with respect to the bosses 52, 53. In the first embodiment, referring to FIG. 7, the bosses 52, 53 are arranged symmetrical with respect to the prism mounting reference line $Cl_1$ which corresponds to the optical axis of detection light 204 emitted from a light emitting element 202. On the other hand, the boss insertion holes 50, 51 are arranged unsymmetrical with respect to the optical axis $Cl_2$ of the horizontal portion 42 of the prism 41, i.e. they are displaced in the direction of the optical axis $Cl_2$.

Next, the operation of the first embodiment will be described. With the optical axis $Cl_2$ of the prism 41 inclined rightward with respect to the prism mounting reference line $Cl_1$ of the upper half 2a as indicated by two-dot chain line in FIG. 6, the first and second bosses 52, 53 are inserted into the first and second boss insertion holes 50, 51. Then, when rotating the prism 41 counterclockwise to make the optical axis $Cl_2$ of the prism 41 correspond to the prism mounting reference line $Cl_1$ of the upper half 2a, the bosses 52, 53 contact the inner peripheral surfaces of the boss insertion holes 50, 51 as indicated by fully drawn line in FIG. 6, positioning the prism 41.

Figure 8A:
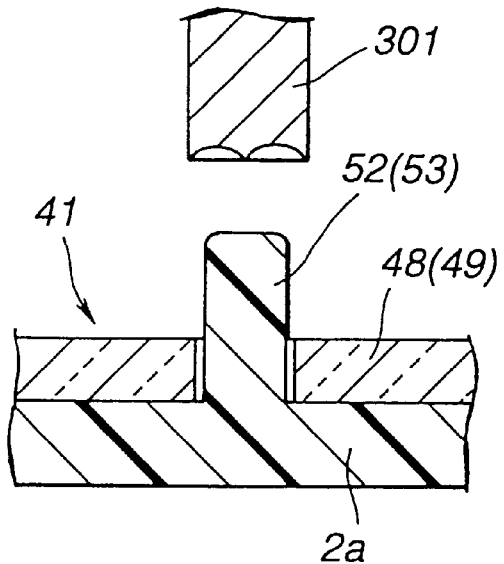
FIGS. 8A–8B are sectional views showing a process of forming a head of a boss.
Figure 8B:
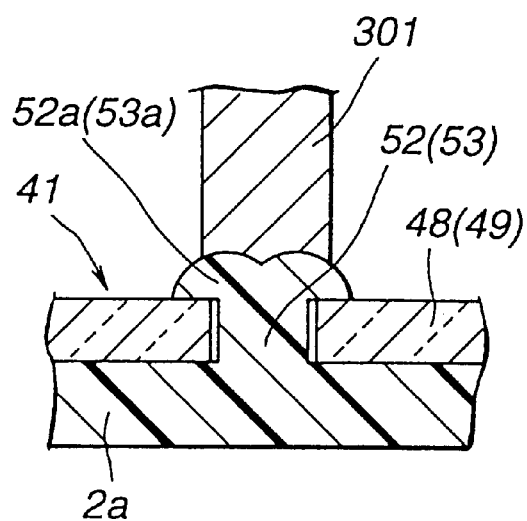

Referring to FIGS. 8A–8B, ends of the bosses 52, 53 are put to a horn 301 of an ultrasonic welding machine and subjected to ultrasonic wave to form heads 52a, 53a. Thus, the prism 41 is mounted on the inner surface of the upper half 2a.

Figure 9:
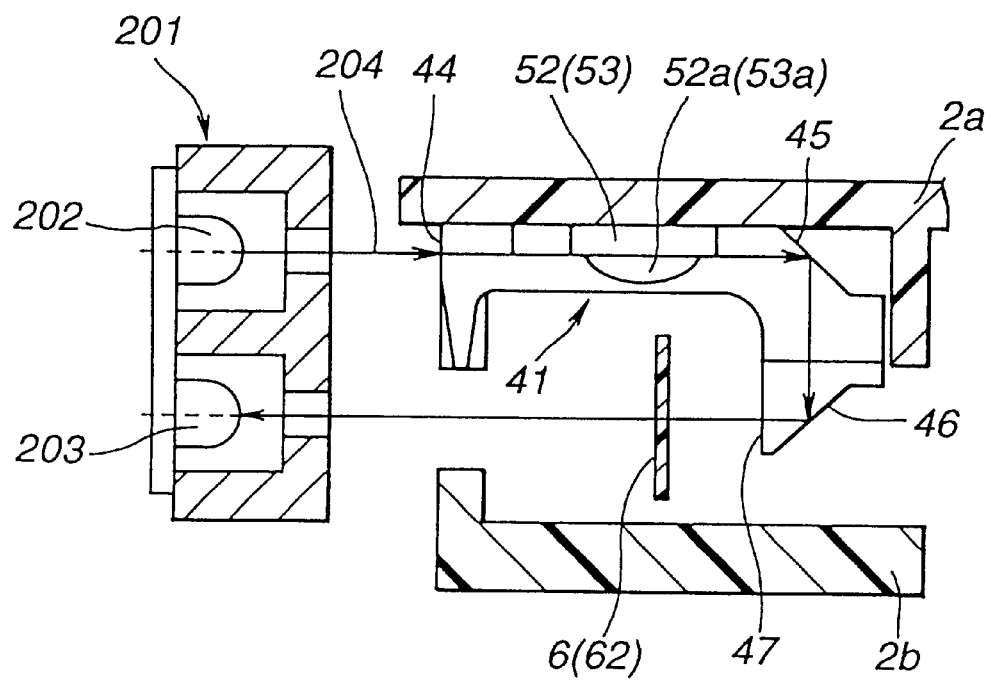
FIG. 9 is a view similar to FIG. 8B, showing detection of a tape end.

Referring to FIG. 9, when inserting the tape cassette 1 into a drive, the incidence plane 44 of the prism 41 faces the light emitting element 202 of the tape-position sensor 201 of the drive, whereas the projection plane 47 of the prism 41 faces the light receiving element 203 of the tape-position sensor 201. Detection light 204 emitted from the light emitting element 202 enters the prism 41 through the incidence plane 44, which is perpendicularly reflected by the first and second reflecting surfaces 45, 46, then projected from the projection plane 47 to the magnetic tape 6 and a transparent leader tape 62 connected to an end thereof through a splicing tape 61 (see FIG. 3). A difference in quantity of detection light 204 after passing through the magnetic tape 6 or the leader tape 62 is detected by the light receiving element 203 to determine an tape end, etc.

Figure 10:
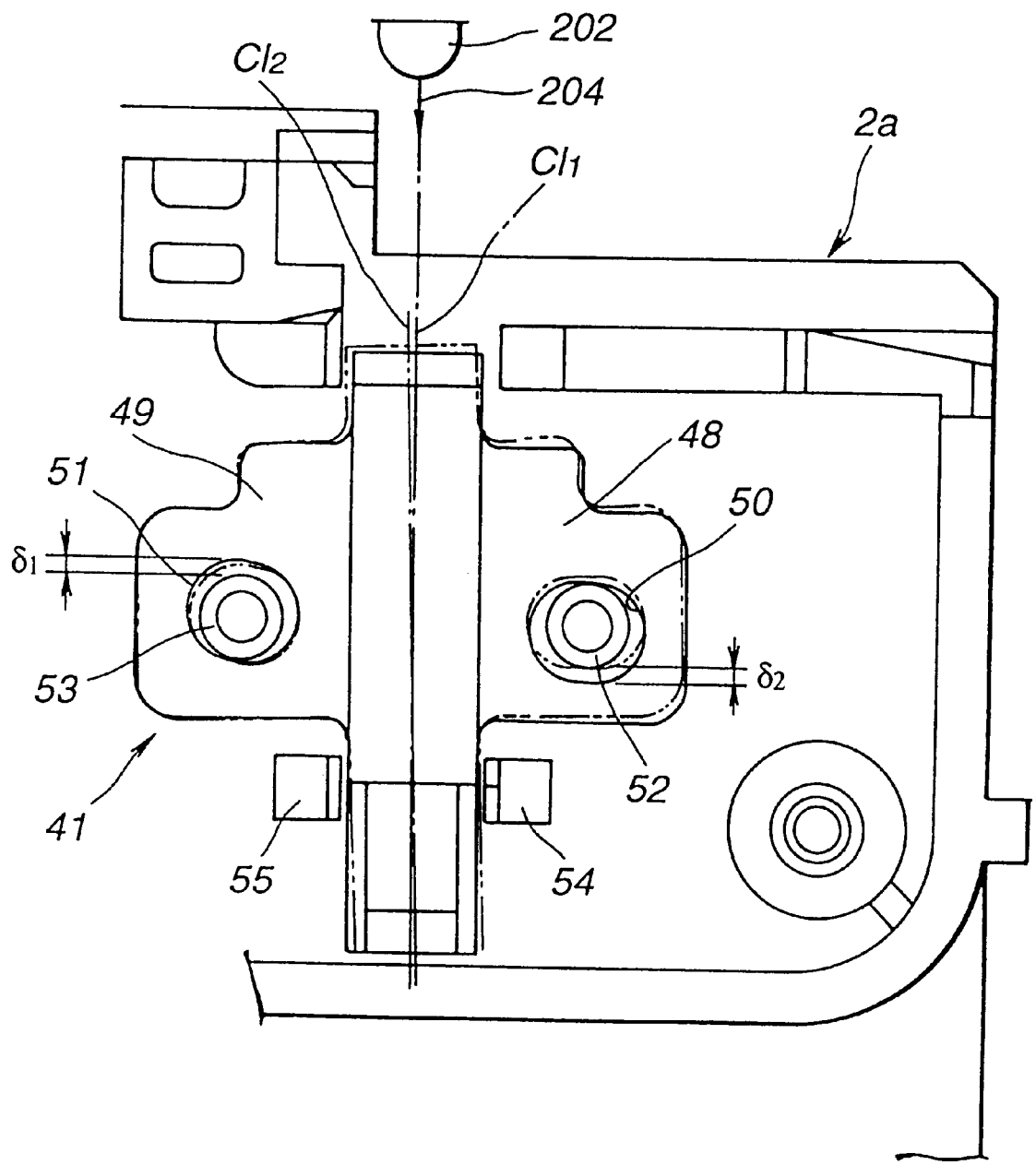
FIGS. 10–11 are views similar to FIG. 7, showing a variant of the first embodiment.
Figure 11:
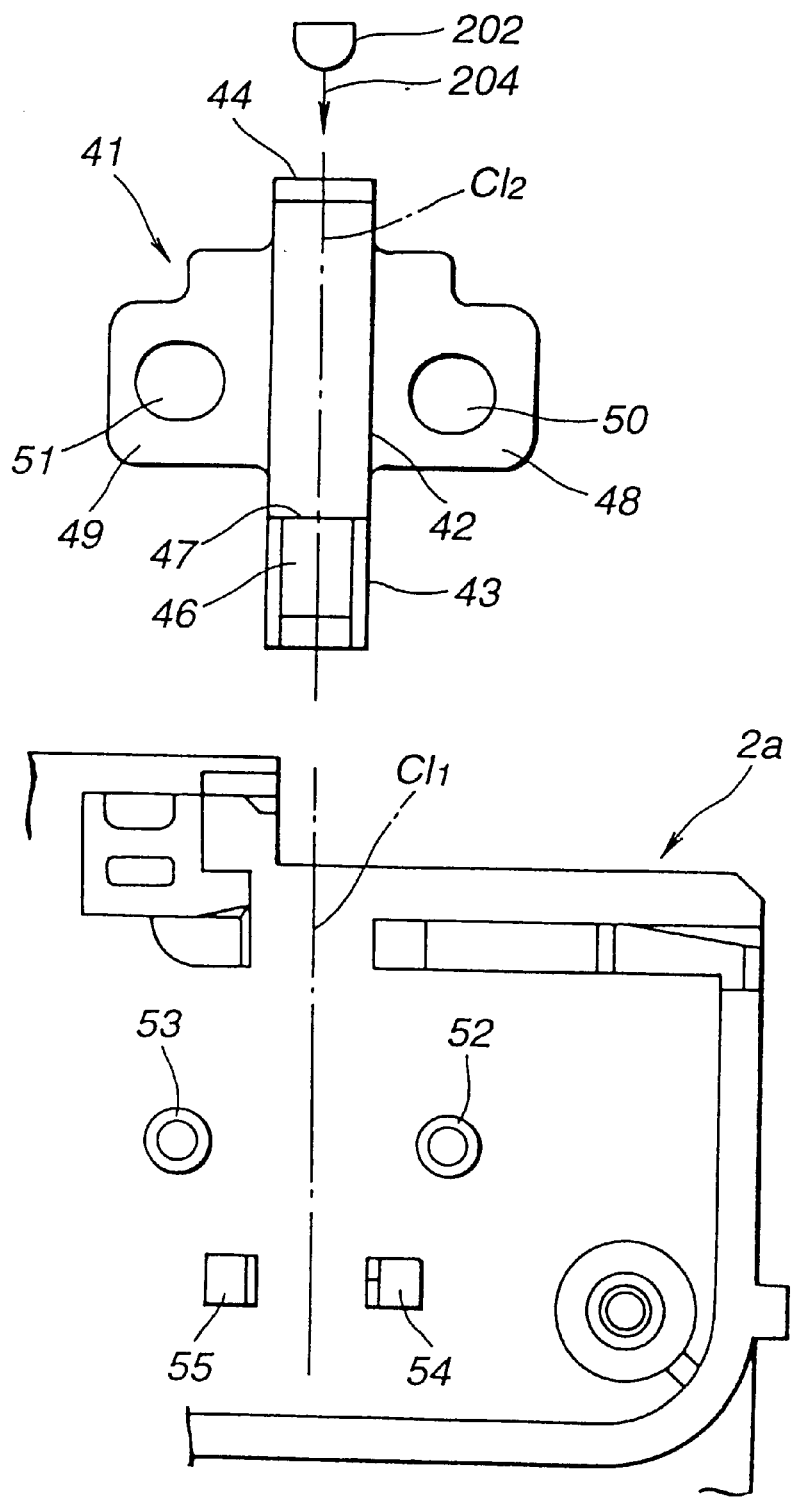

FIGS. 10–11 show a variant of the first embodiment wherein the second boss insertion hole 51 is displaced to the projection plane 47 of the prism 41 with respect to the first boss insertion hole 50. With the optical axis $Cl_2$ of the prism 41 inclined leftward with respect to the prism mounting reference line $Cl_1$ of the upper half 2a as indicated by two-dot chain line in FIG. 10, the first and second bosses 52, 53 are inserted into the first and second boss insertion holes 50, 51. Then, when rotating the prism 41 clockwise to make the optical axis $Cl_2$ of the prism 41 correspond to the prism mounting reference line $Cl_1$ of the upper half 2a, the bosses 52, 53 contact the inner peripheral surfaces of the boss insertion holes 50, 51 as indicated by fully drawn line in FIG. 10, positioning the prism 41.

Figure 12:
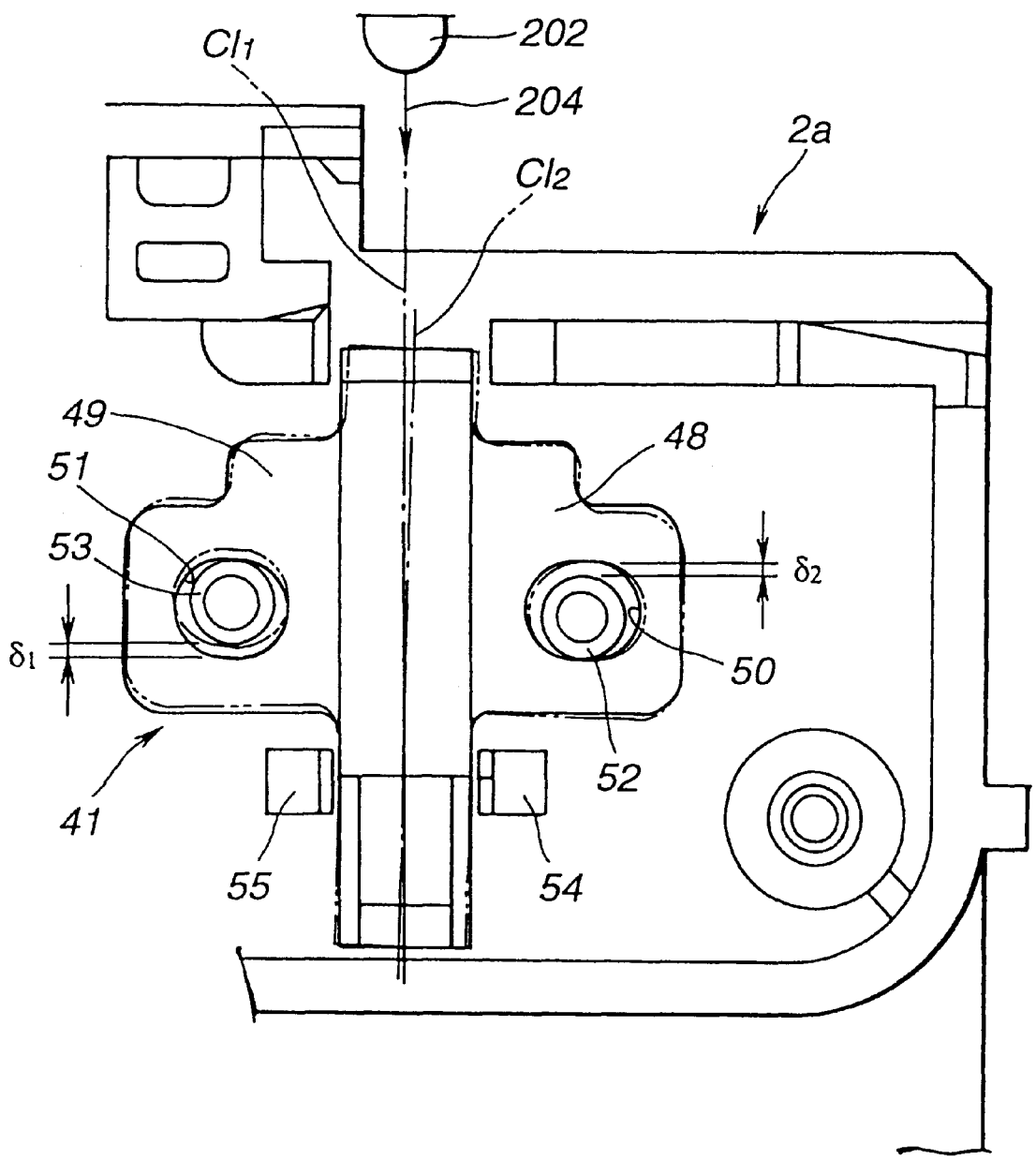
FIGS. 12–13 are views similar to FIG. 11, showing a second embodiment of the present invention.
Figure 13:
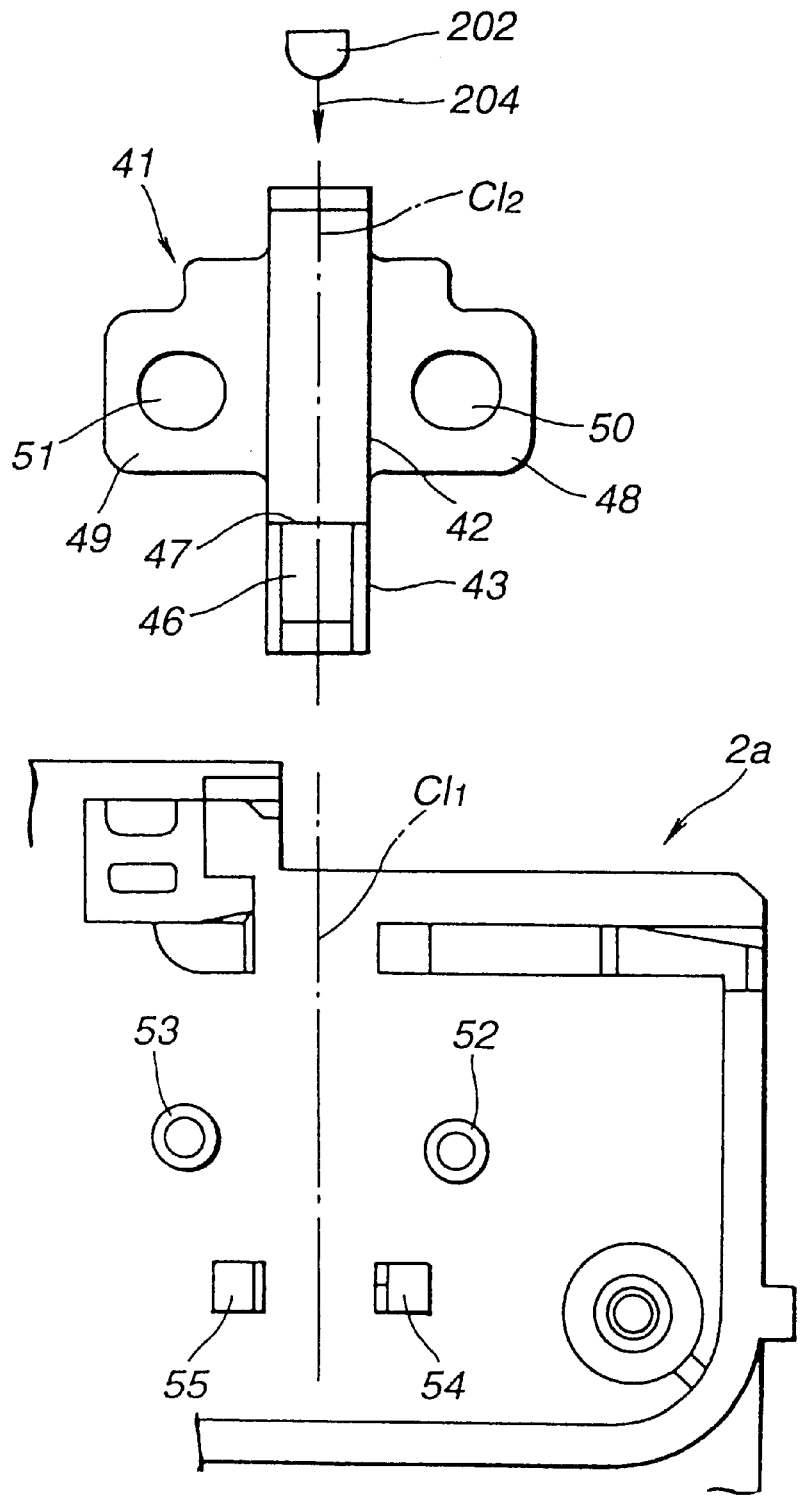
Figure 14:
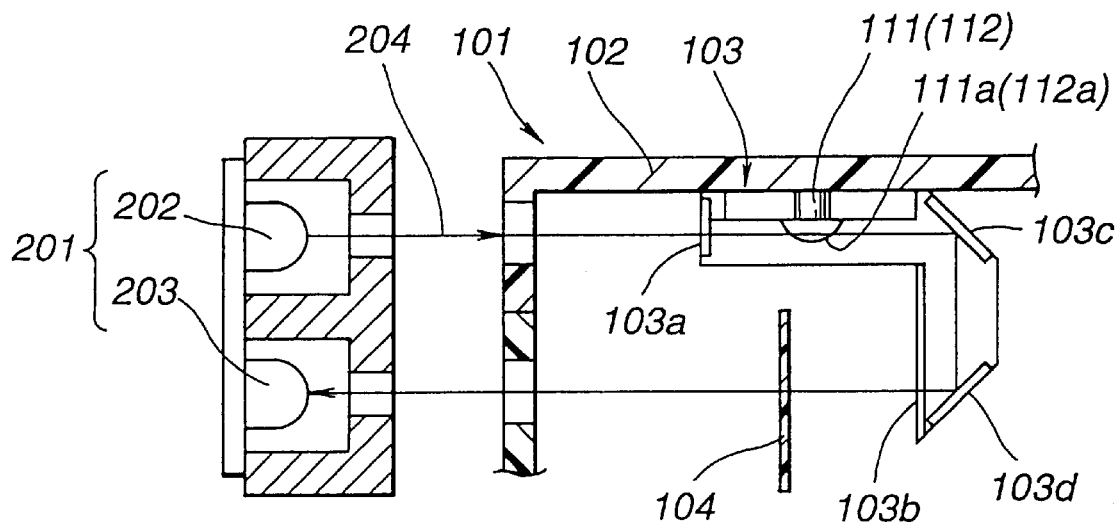
FIG. 14 is a view similar to FIG. 9, showing a known tape cassette.
Figure 15:
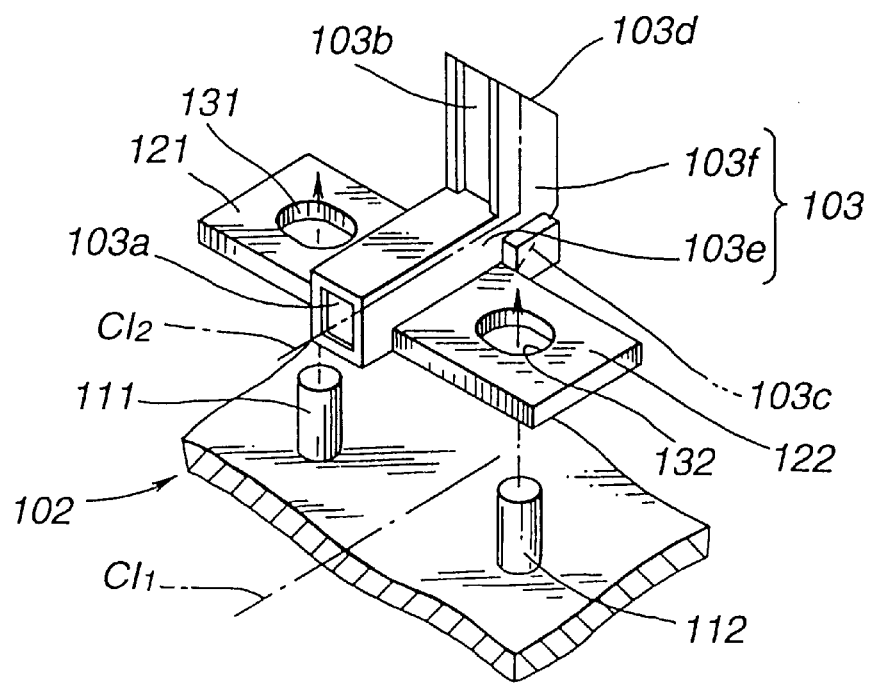
FIG. 15 is a view similar to FIG. 5, showing the known tape cassette.
Figure 16A:
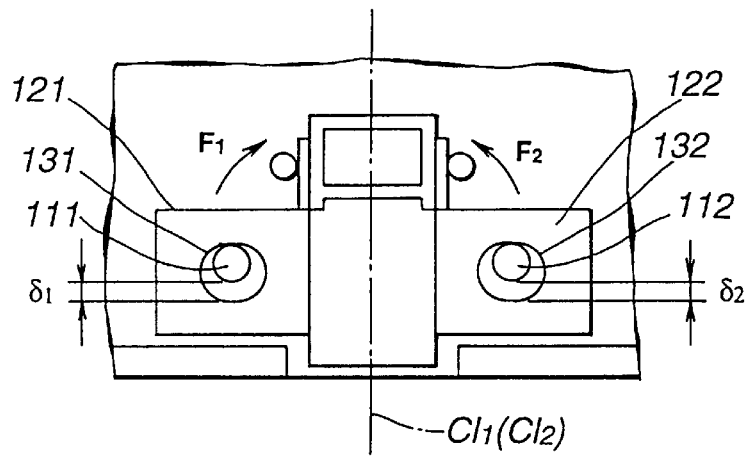
FIGS. 16A–16C are views similar to FIG. 13, showing a prism arranged in the known tape cassette.
Figure 16B:
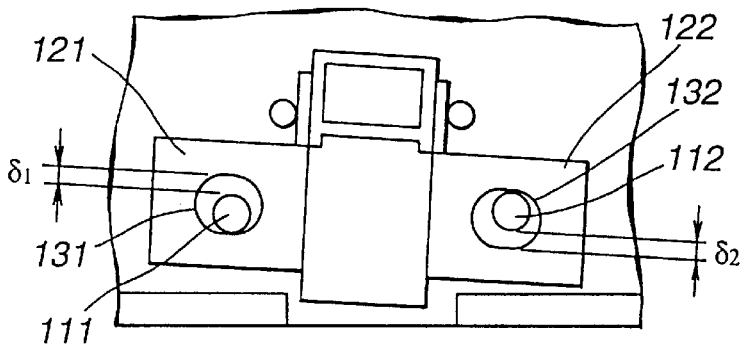
Figure 16C:
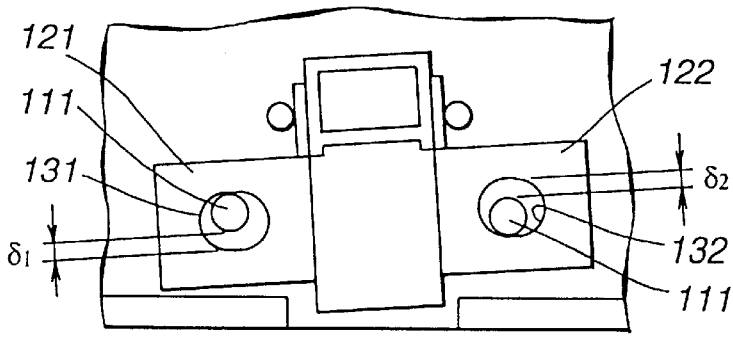
Figure 17:
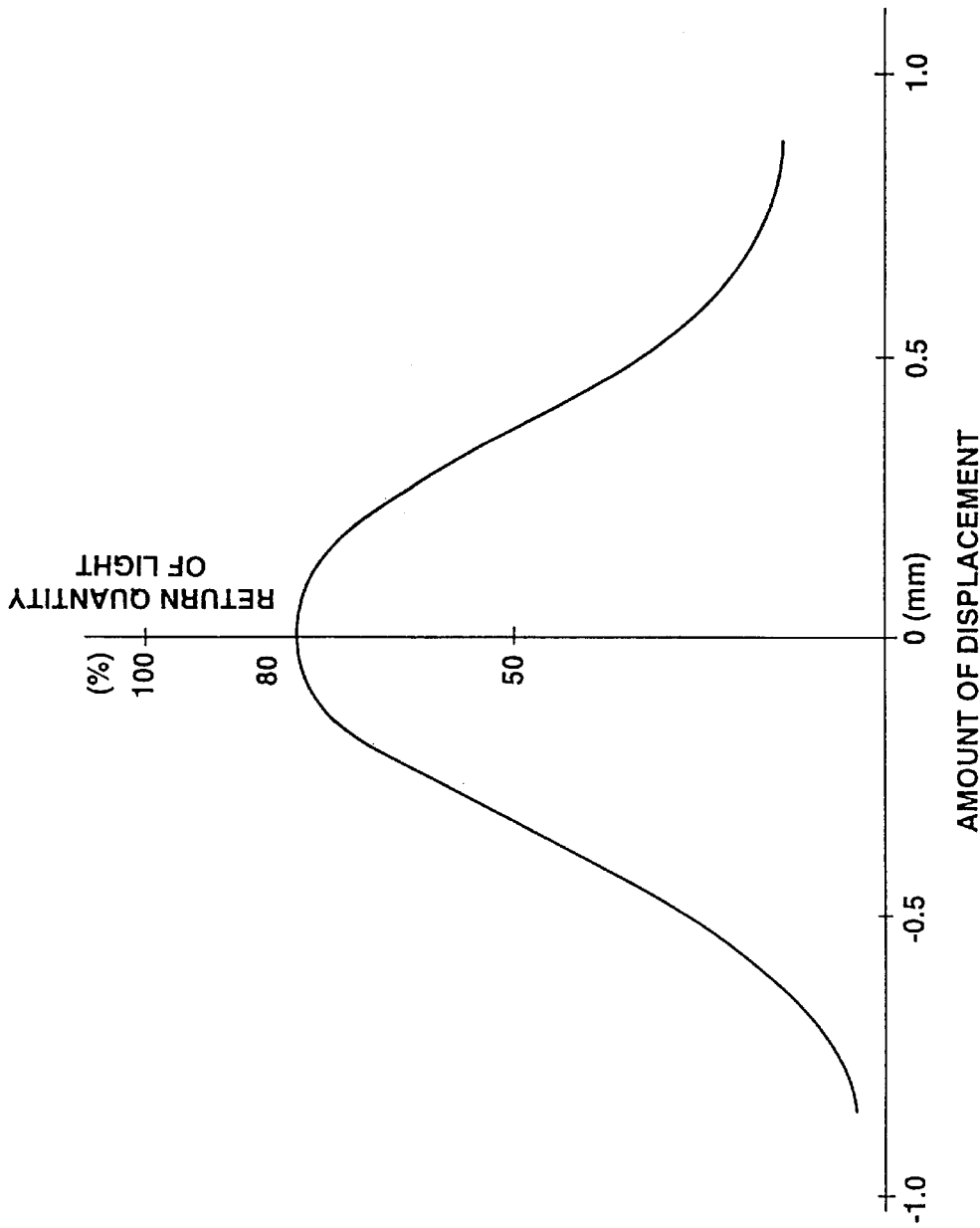
FIG. 17 is a graph showing characteristics of the prism.
Figure 18:
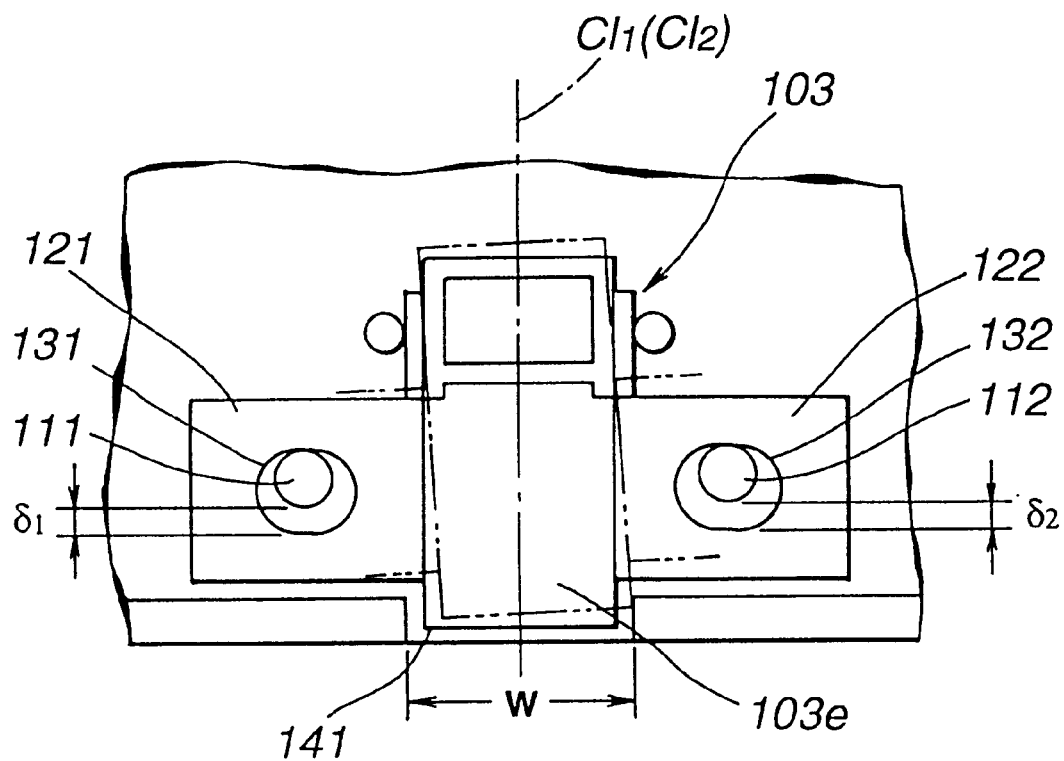
FIG. 18 is a view similar to FIG. 16C, showing another known tape cassette.

FIGS. 12–13 show a second embodiment of the present invention which is substantially the same as the first embodiment except that the first and second boss insertion holes 50, 51 are arranged symmetrical with respect to the optical axis $Cl_2$ of the horizontal portion 42 of the prism 41, whereas the first and second bosses 52, 53 are arranged unsymmetrical with respect to the prism mounting reference line $Cl_1$ which corresponds to the optical axis of detection light 204 emitted from the light emitting element 202 of the tape-position sensor 201. With the optical axis $Cl_2$ of the prism 41 inclined rightward with respect to the prism mounting reference line $Cl_1$ of the upper half 2a as indicated by two-dot chain line in FIG. 12, the first and second bosses 52, 53 are inserted into the first and second boss insertion holes 50, 51. Then, when rotating the prism 41 counterclockwise to make the optical axis $Cl_2$ of the prism 41 correspond to the prism mounting reference line $Cl_1$ of the upper half 2a, the bosses 52, 53 contact the inner peripheral surfaces of the boss insertion holes 50, 51 as indicated by fully drawn line in FIG. 12, positioning the prism 41.

Having described the present invention with regard to the preferred embodiments, it is noted that the present invention is not limited thereto, and various changes and modifications can be made without departing from the scope of the present invention.

By way of example, in the embodiments, the first and second boss insertion holes 51, 52 or the first and second bosses 52, 53 are displaced in the direction of the optical axis. Alternatively, the boss insertion holes 50, 51 or the bosses 52, 53 may be different in diameter from each other to obtain the same effect as that in the disclosed embodiments.

Moreover, in the disclosed embodiments, the first and second boss insertion holes 50, 51 are shaped like an ellipse with a major axis in the direction perpendicular to the optical axis. Alternatively, the boss insertion holes 50, 51 may be shaped in other forms such as a rectangle and a circle.

What is claimed is:

1. A tape cassette for use in a drive with a tape-position sensor emitting a light, comprising:

a shell with an inner surface;

first and second bosses arranged on said inner surface of said shell; and a prism mounted on said inner surface of said shell, said prism being formed with first and second holes and having an optical axis, said optical axis corresponding to and coincident with an optical axis of the light emitted from the tape-position sensor;

said first and second bosses being arranged through said first and second holes; so that when said first and second bosses contact inner peripheral surfaces of said first and second holes, a first clearance between said first boss and said first hole and a second clearance between said second boss and second hole are defined, said first and second clearances being produced in an opposite direction of said first and second bosses with respect to said optical axis of said prism.

2. A tape cassette as claimed in claim 1, wherein said first and second bosses are displaced from each other with respect to said optical axis of said prism.

3. A tape cassette as claimed in claim 1, wherein said first and second holes are displaced from each other with respect to said optical axis of said prism.

4. A tape cassette as claimed in claim 1, wherein said first and second holes are long in a direction perpendicular to said optical axis of said prism.

5. An arrangement, comprising:
   a drive with a tape-position sensor emitting a light, and
   a tape cassette arranged in said drive when used, said tape cassette comprising:
      a shell with an inner surface;
      first and second bosses arranged on said inner surface of said shell;
      a prism mounted on said inner surface of said shell, said prism being formed with first and second holes and having an optical axis, said optical axis corresponding to and coincident with an optical axis of the light emitted from the tape-position sensor;
      said first and second bosses being arranged through said first and second holes; and
      when said first and second bosses contacting inner peripheral surfaces of said first and second holes, a first clearance between said first boss and said first hole and a second clearance between said second boss and second hole, said first and second clearances being produced in an opposite direction of said first and second bosses with respect to said optical axis of said prism.

* * * * *